United States Patent [19]
Vergnolle

[11] 3,764,940
[45] Oct. 9, 1973

[54] ADMITTANCE-MATCHING NETWORK FOR THE PARALLEL CONNECTION OF WIDE-BAND ACTIVE POWER ELEMENTS

[75] Inventor: Claude Vergnolle, Paris, France

[73] Assignee: Thomson-CSF, Paris, France

[22] Filed: Mar. 27, 1972

[21] Appl. No.: 238,555

[30] Foreign Application Priority Data

Apr. 13, 1971 France .............................. 7112965

[52] U.S. Cl. ........................ 333/8, 333/32, 333/70 R
[51] Int. Cl. ............................ H03h 7/02, H03h 7/38
[58] Field of Search ........................ 333/33, 32, 8, 9, 333/6, 11, 1, 70 R, 77, 84 M

[56] References Cited

UNITED STATES PATENTS

| | | | |
|---|---|---|---|
| 3,646,478 | 2/1972 | Ross | 333/9 X |
| 3,578,110 | 6/1971 | Woodward | 333/9 X |
| 3,192,490 | 6/1965 | Petts et al. | 333/11 |
| 3,454,905 | 7/1969 | Winegard | 333/8 |
| 3,697,895 | 10/1972 | Beck | 333/8 |
| 3,585,533 | 6/1971 | Denhard | 333/84 M X |
| 3,132,313 | 5/1964 | Alford | 333/32 |
| 2,782,379 | 2/1957 | Diambra et al. | 333/9 X |
| 3,438,029 | 4/1969 | Fuchser et al. | 333/6 X |

OTHER PUBLICATIONS

Hinden, "Standing Wave Ratio of Binary Tem Power Dividers" in IEE Transactions on Microwave Theory and Techniques, Feb. 1968; pp. 123–123–125.

*Primary Examiner*—Rudolph V. Rolinec
*Assistant Examiner*—Marvin Nussbaum
*Attorney*—John W. Malley et al.

[57] ABSTRACT

An admittance-matching device for active elements such as amplifiers or oscillators with parallel-connected transistors is intended for operation in the high-frequency range for example at frequencies in the order of one gigacycle per second.

A network of identical admittance transformers with $p$ stages ($F_1$ for the first stage, $F_2$ for the second), is connected to a single pair of terminals of the circuit (network and active elements) on the one hand, and on the other hand to the pairs of terminals of the active elements. Each admittance transformer presents at the single pair of terminals an admittance lower than or equal to the admittance of the active elements.

4 Claims, 6 Drawing Figures

ADMITTANCE-MATCHING NETWORK FOR THE PARALLEL CONNECTION OF WIDE-BAND ACTIVE POWER ELEMENTS

The present invention relates to impedance-matching devices for parallel-connected active elements such as transistor amplifiers, transistor oscillators, avalanche oscillators, Gunn diodes etc, intended for operation in the high-frequency range, for example at frequencies in the order of one gigacycle per second. Accordingly, in order to achieve increasingly higher powers at the output of an amplifier or oscillator, it is possible either to use parallel-connected elements or to use semicomducmductors with a progressively greater active area.

In either case, the input impedance of the semiconductor is the lower the larger the number of elements or the larger the area, and thus the higher the power it is desired to obtain.

However, especially when the frequency rises to around 1 Gc/s or more, impedance-matching becomes very difficult or even impossible, especially within a wide band.

The invention enables these drawbacks to be overcome by grouping several active elements, each connected to a pair of output terminals of a power dividing network, this network having only one pair of input terminals.

This power-dividing network has impedance-matching cells, each cell having an input impedance higher than the input impedance of each of the active elements.

The invention will be better understood from a consideration of the ensuing description which by way of example illustrates a transistor amplifier circuit, reference being made to the attached drawings in which.

Figure 1:
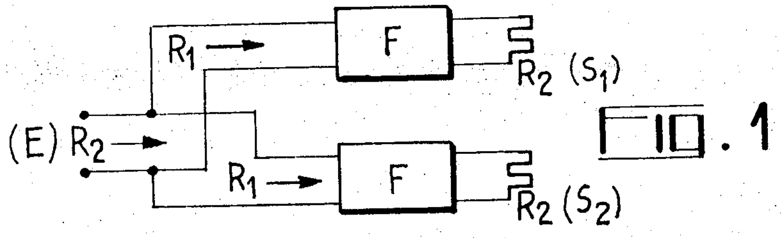
FIGS. 1 and 2 illustrate power-dividers in accordance with the invention.

In FIG. 1, an impedance-matching network, having a pair of input terminals E, and two pairs of output terminals $S_1$ and $S_2$, which in accordance with the invention comprise two impedance-matching cells F, has been illustrated.

Between the terminals of outputs $S_1$ and $S_2$ of the network, resistors $R_2$ have been respectively connected, each representing the input resistance of an active element. The input inductance and capacitance of each active element are contained in the impedance network of each unit F. The input terminals of the units F are placed in parallel with the input terminals E of the network. The impedance of each unit F, measured at its input terminals, is equal to $R_1$.

If $R_1 = 2\ R_2$, then the impedance of the network shown in FIG. 1, measured across its input terminals, is $R_2$. Likewise, impedance-matching units in which : $R_1 > 2\ R_2$ applies, can be produced.

In this case, the input impedance of the network will be higher than $R_2$.

Figure 2:
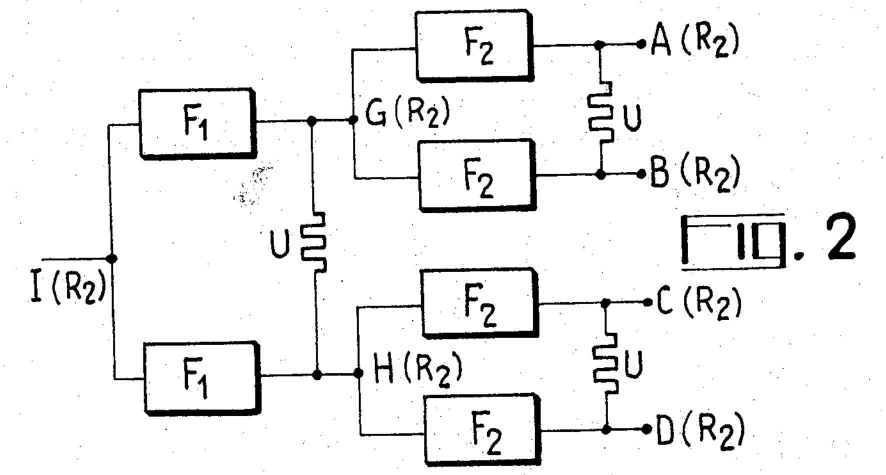

FIG. 2 presents a generalised form of the network shown in FIG. 1. Four active elements A, B, C and D have been shown and a single-wire kind of wiring diagram has been adopted. The pairs of output terminals of the units $F_2$ connected to the input terminals of the elements, are each illustrated by a single point marked A or B or C or D.

The input terminals of the four units $F_2$, which will be called the second stage units, are connected in parallel to the points G and H, respectively, considering the case of an arrangement of groups by pairs. The pairs of terminals illustrated by the pionts G and H constitute the output terminals of two units $F_1$ which will be called first stage units, whose input terminals are connected in parallel and represented by the point I. By assigning to each group of two units, in each stage, the properties of the network of FIG. 1, it will be seen that the resistance $R_2$ of the transistors A, B, C, D, is obtained at each pair of terminals, G, H and I.

The network of FIGS. 2 can be generalised on the one hand by considering $p$ stages and on the other hand by grouping the units of the different stages in numbers $q > 2$. Finally, balance resistors such as those U can be provided, which are connected in each stage between points of equipotential such as G and H, A and B, C and D. These resistors introduce no modification as far as phase displacements are equally distributed but can absorb some of the unbalance due to the difference between two active elements. These resistors can be designed so that their resistances are in accordance with the classic coupling theory.

Figure 3:
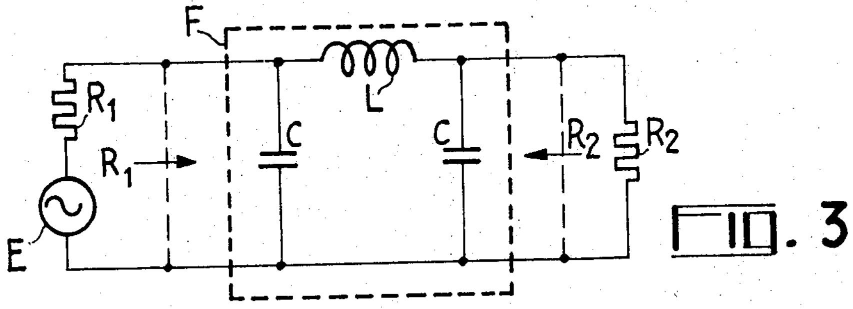
FIG. 3 is an example of a $\pi$-impedance-matching network.

In FIG. 3, an embodiment of an impedance-matching unit in the form of a four-terminal device F supplied by a source S of angular frequency $\omega$ and internal impedance $R_1$, with a load of impedance $R_2$, has been illustrated. The impedance-matching network is in this case a symmetrical $\pi$ network of wave impedance : $Z_o = \sqrt{R_1 R_2}$ (1)

Figure 4:
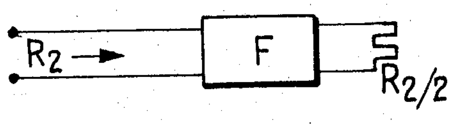
FIG. 4 is a known simple matching circuit given by way of example.

In the case of FIGS. 1 and 2, $R_1 = 2\ R_2$ and consequently : $Z_o = R_2 \sqrt{2}$ The values of the inductance $L$ and the capacitance $C$ constituting the unit, are thus : $L = Z_o/\omega$ $C = 1/Z_o\,\omega$ FIG. 4 points up an advantage of the invention. It illlustrates an impedance transformer F which may be a $\pi$ network of the type shown in FIG. 3. In the case where the resistance of a transistor is $R_2$, the load represented by two parallel-connected transistors is $R_2/2$. Under these circumstances, to obtain the resistance $R_2$ at the unit input, the condition : $Z_o = \sqrt{R_2^2/2} = R_2/\sqrt{2}$ must hold.

It will be seen, therefore, that in the case of transistors connected directly in parallel across the output terminals of an impedance transformer, the wave impedance is $R_2/\sqrt{2}$ instead of $R_2\sqrt{2}$ (in the case of the invention). The same would apply if, instead of two parallel-connected transistors, a single transistor of twice the power and impedance $R_2/2$, were used.

Since the impedance $Z_o$ is then two times smaller than in the case of the invention, the inductance $L$ will likewise have to be two times smaller and the upper limit on frequency imposed by this fact on the power amplifier will be lower than the limit encountered in the case of the network in accordance with the invention. This can, of course, be generalized to cover the case of n elements.

Figure 5:
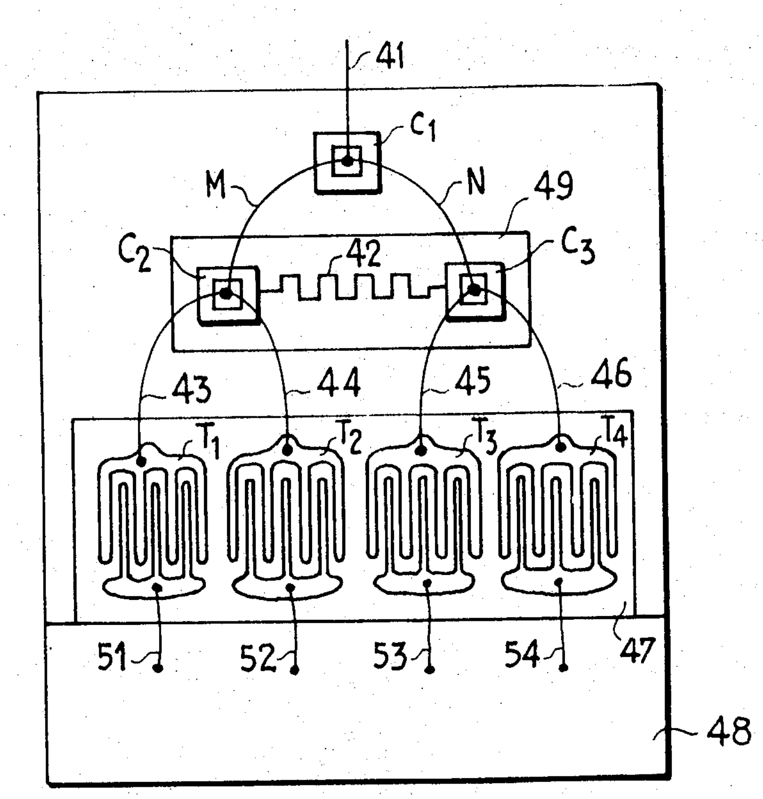
FIGS. 5 and 6 illustrate plan and sectional views of an embodiment of the invention.

FIG. 5, by way of an example of the invention, shows a system comprising four groups of $q$ fingers forming bipolar transistors of "interdigital type" $T_1$ to $T_4$ produced on one and the same substrate or constituted by two or four built-up elements assembled on a beryllium oxide plate 47 itself mounted on a support 48 which is both an electrical earth and a thermal radiator. In the particular case of the amplifier under discussion here, the emitters of these transistors are earthed to the support 48. The inputs of the transistors $T_1$ to $T_2$, in this case their bases, are connected by leads 43 and 44 having an inherent inductance, to the insulated electrode of the capacitor $C_2$, and the inputs of the transistors $T_3$ and $T_4$ are likewise connected by leads 45 and 46 to the insulatd electrode of a capacitor $C_3$. The two groups of transistors are then connected to one and the same capacitor $C_1$ through two wires $M$ and $N$ which are themselves designed to provide the inductive component of the second stage of the filter. The input of the network is a lead 41 connected to the insulated electrode of the capacitor $C_1$. The capacitors $C_1$, $C_2$, $C_3$ are either of the MOS type (metal oxide semiconductor) or of the ceramic type of again may be produced by thin-film techniques. The last units $F$ of FIGS. 2 and 3 are constituted here by the inductancs of the lead wires 43, 44 etc. supplemented by the input capacitances of the transistors $T_1$ and $T_2$. Between the capacitors $C_2$ and $C_3$ there is arranged a balance resistor 42 which is obtained by vaporisation in vacuo or the type in which doping impurities are diffused into a semiconductor wafer. The latter may be the same plate or wafer in which at the same time the MOS capacitors $C_2$ and $C_3$ have been formed.

Balance resistors can furthermore advantageously be provided in all the embodiments between the points having the same potential at the output of each impedance transformer.

Figure 6:
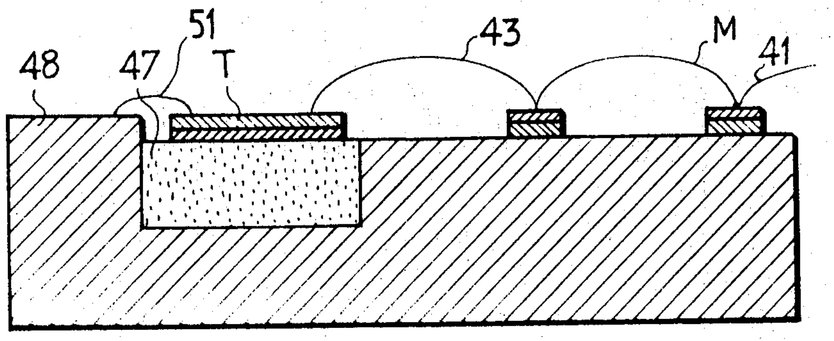

In the sectional view shown FIG. 6, the principal elements of FIG. 5 are encountered again and the beryllium oxide plate or wafer 47 which insulates the transistors and evacuates the heat they develop, can clearly be seen.

The invention is applicable likewise to wholely integrated structures, that is to say the same plate or wafer which carries the active elements, carries the lead inductances which can be produced simultaneously by the beam-lead technique instead of being in the form of wires or strips.

The network of power elements described hereinbefore is just as valid in application to amplifiers as to transistor oscillators or ones with Gunn diodes or avalanche diodes.

In the case of a power amplifier made up of transistors in a common-emitter arrangement for example, the input is to the bases. The emitters will be earthed either directly through a very short wire or through the medium of a set of inductances and capacitances in the form of lumped constants in accordance with the technology described hereinbefore, in order to produce a negative feedback network. The output is taken at collectors which can generally all be connected in parallel because the impedance is much higher than the input and, moreover, if required, one can use a network with a grouping similar to that at the input, but with fewer stages. In the case of transistor oscillators, the connecting elements at the output will be utilised to provide the matching, at the desired frequency. Finally, in the case of negative resistance oscillators or amplifiers (Gunn diodes or avalanche diodes) the input and the output being separated by a circulator, the tuning of the semiconductor to the desired frequency can be achieved by a second calibrated lead wire terminating in a low-pass capacitor in order to be able to introduce the bias.

What I claim is :

1. An admittance matching network, having a first pair of terminals and first admittance connected across said first pair, and $n$ second pairs of terminals, for matching $n$ second admittances respectively connected across said second pairs, to said first admittance, the admittance value of said first admittance being substantially lower than the sum of said second admittances, said network comprising : $p$ successive stages of admittance transformers, staggered between said first pair and said $n$ second pairs and, in each stage, $q$ groups of transformers, having respective first and second pairs of terminals, said first pairs being parallely connected to the second pair of terminals of a transformer of the preceeding stage, and said second pairs of terminals being connected in parallel to the first pairs of terminals of a group of q transformers of the following stage, the group of rank one having its first pairs connected in parallel to said first pair and the group having the rank $p$ comprising n transformers having their second pairs connected respectively to said second admittances, the transformation ratio of each transformer being equal to $q$, and $n$ being equal to $q^p$, said admittance transformers being low pass filters of the $\pi$ type, each comprising a lumped capacitor and wires, having a length substantially lower than the operating wavelength constituting the inductances of said filter.

2. A network as claimed in claim 1, wherein said lumped capacitors are constituted by ceramics.

3. A network as claimed in claim 1, wherein said lumped capacitors are constituted by MOS (metal oxyde semiconductor) type capacitors.

4. A network as claimed in claim 1, wherein said lumped capacitors are constituted by thin film capacitors.

* * * * *